(12) United States Patent
Chen

(10) Patent No.: US 8,073,513 B2
(45) Date of Patent: Dec. 6, 2011

(54) WIRELESS COMMUNICATION DEVICE

(75) Inventor: Chun-Liang Chen, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 387 days.

(21) Appl. No.: 12/430,120

(22) Filed: Apr. 27, 2009

(65) Prior Publication Data

US 2009/0312078 A1 Dec. 17, 2009

(30) Foreign Application Priority Data

Jun. 16, 2008 (CN) .......................... 2008 1 0302153

(51) Int. Cl.
*H04M 1/00* (2006.01)
(52) U.S. Cl. .................. 455/575.6; 455/569.1
(58) Field of Classification Search ............... 455/575.6, 455/66.1, 569.1, 575.2, 575.7; 379/428.01, 379/428.02, 430, 431; 381/23.1, 74, 309, 381/312, 313
See application file for complete search history.

(56) References Cited

U.S. PATENT DOCUMENTS

| | | | |
|---|---|---|---|
| 6,332,119 B1 | 12/2001 | Hinderks | |
| 7,039,437 B2 | 5/2006 | Kojola et al. | |
| 7,856,611 B2 * | 12/2010 | Pisek et al. | 716/117 |
| 7,937,076 B2 * | 5/2011 | Zeller et al. | 455/418 |
| 2006/0172780 A1 | 8/2006 | Krippgans | |
| 2007/0248055 A1 | 10/2007 | Jain et al. | |
| 2007/0286426 A1 * | 12/2007 | Xiang et al. | 381/17 |

FOREIGN PATENT DOCUMENTS

TW I242994 11/2005

* cited by examiner

*Primary Examiner* — Brian Young
(74) *Attorney, Agent, or Firm* — Altis Law Group, Inc.

(57) ABSTRACT

A wireless communication device includes an earphone, a frequency modulation integrated circuit, a microphone, an analog switch, and a main processor. The main processor includes a software amplifier operable to amplify signals from the analog switch and output the amplified signals. The wireless communication device amplifies audio signals by the software amplifier of the main processor.

12 Claims, 4 Drawing Sheets

WIRELESS COMMUNICATION DEVICE

BACKGROUND

1. Technical Field

The disclosure relates to wireless communications, and particularly to a wireless communication device requiring no external amplification.

2. Description of Related Art

Manufacturers often integrate radio and music playing functions into wireless communication devices to satisfy customers' needs. Such devices generally require the inclusion of an audio amplifier to produce audio of a suitable volume. For example, as shown in FIG. 1, a wireless communication device 1 includes a frequency modulation (FM) integrated circuit (IC) 10, a main processor 11, an external audio amplifier 12 and an earphone 13.

The FM IC 10 receives radio frequency signals from the earphone 13, and outputs demodulated signals to the external audio amplifier 12. The main processor 11 processes audio signals from a microphone 14, and outputs the processed audio signals to the external audio amplifier 12. The external audio amplifier 12 amplifies the demodulated signals from the FM IC 10 or the processed audio signals from the main processor 11, and outputs the amplified signals to the earphone 13. The earphone 13 plays the amplified signals from the external audio amplifier 12.

However, in order for the external audio amplifier 12 to amplify audio signals, a physical circuit often needs to occupy requisite space in the wireless communication device 1. Thus, the wireless communication device 1 presents increased size and cost.

DETAILED DESCRIPTION

Figure 1:
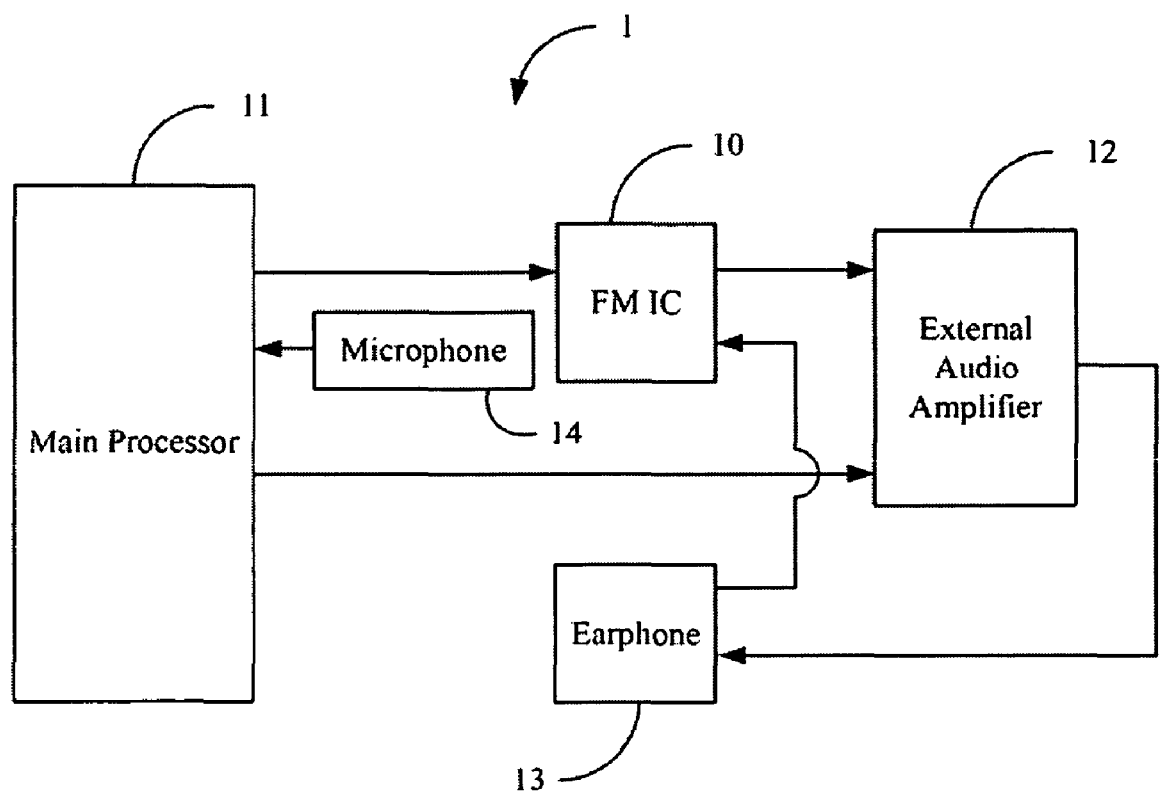
FIG. 1 is a schematic diagram of a commonly used wireless communication device.
Figure 2:
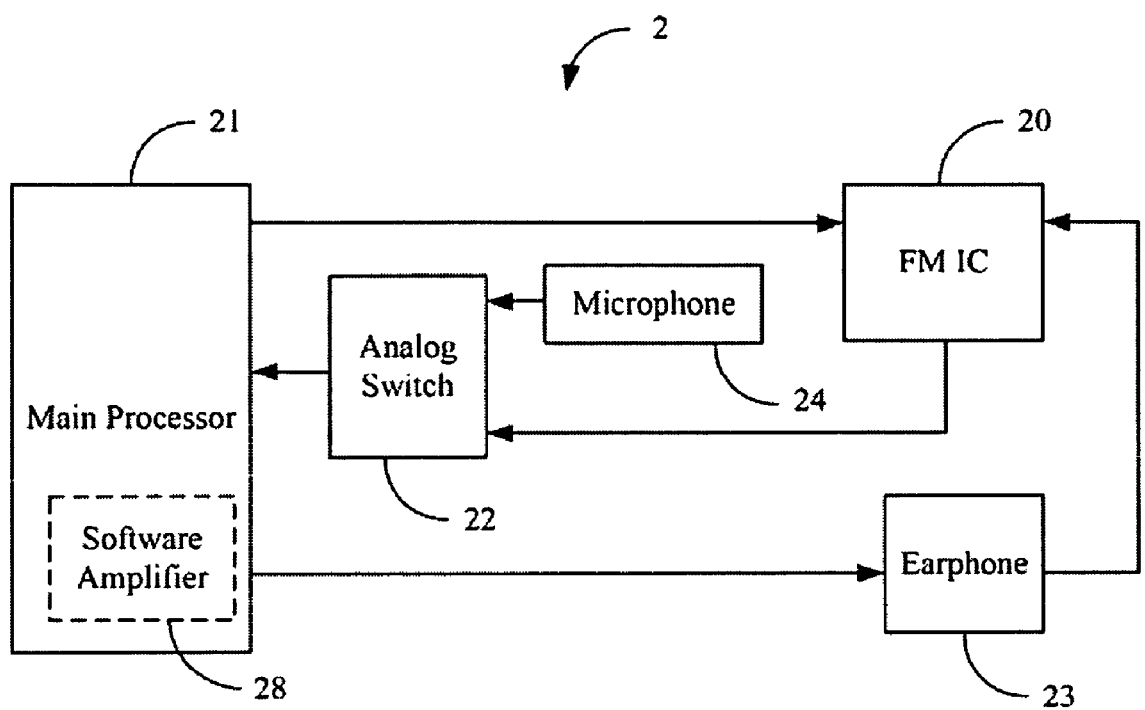
FIG. 2 is a schematic diagram of one embodiment of a wireless communication device as disclosed.

FIG. 2 is a schematic diagram of one embodiment of a wireless communication device 2 as disclosed. The wireless communication device 2 includes a frequency modulation (FM) integrated circuit (IC) 20, a main processor 21, an analog switch 22, an earphone 23, and a microphone 24. The wireless communication device 2 may selectively function in a radio or communication mode. In the radio mode, the wireless communication device 2 transmits radio content received by the earphone 23, with the FM IC 20 turned on. In the communication mode, voice communication to other device users is accomplished via the wireless communication device 2, with the FM IC 20 turned off.

In one embodiment, the earphone 23 acts as an internal antenna to receive radio frequency (RF) signals from the air when electrically connected to the wireless communication device 2, when the wireless communication device 2 is in the radio mode. The FM IC 20, connected to the earphone 23, receives and demodulates the RF signals from the earphone 23 and outputs the demodulated signals. The microphone 24 receives communication voice signals and outputs the communication voice signals when the wireless communication device 2 is in the communication mode.

The analog switch 22 is structured and arranged to receive the demodulated signals from the FM IC 20 or the communication voice signals from the microphone 24 and output the demodulated signals or the communication voice signals to the main processor 21 according to a working mode of the wireless communication device 2. When the wireless communication device 2 is in the radio mode, the analog switch 22 outputs the demodulated signals, and outputs communication voice signals in the communication mode.

The main processor 21, connected to the FM IC 20 and the analog switch 22, includes a software amplifier 28 that is operable to amplify the demodulated signals or the communication voice signals from the analog switch 22 and output the amplified demodulated signals or the amplified communication voice signals to the earphone 23. The main processor 21 turns the FM IC 20 on or off via a control interface (not shown). For example, if the wireless communication device 2 is a mobile phone, when the main processor 21 detects an incoming call, the wireless communication device 2 enters the communication mode, and the main processor 21 prompts a user to turn off the FM IC 20 via the control interface. At this time, the analog switch 22 only receives and outputs the communication voice signals from the microphone 14. When the call ends and the wireless communication device 2 enters the radio mode, the user can turn on the FM IC 20 via the control interface, and the analog switch 22 only receives and outputs the demodulated signals from the FM IC 20 providing radio play.

In one embodiment, the earphone 23 further receives and transmits the amplified demodulated signals or the amplified communication voice signals.

Figure 3:
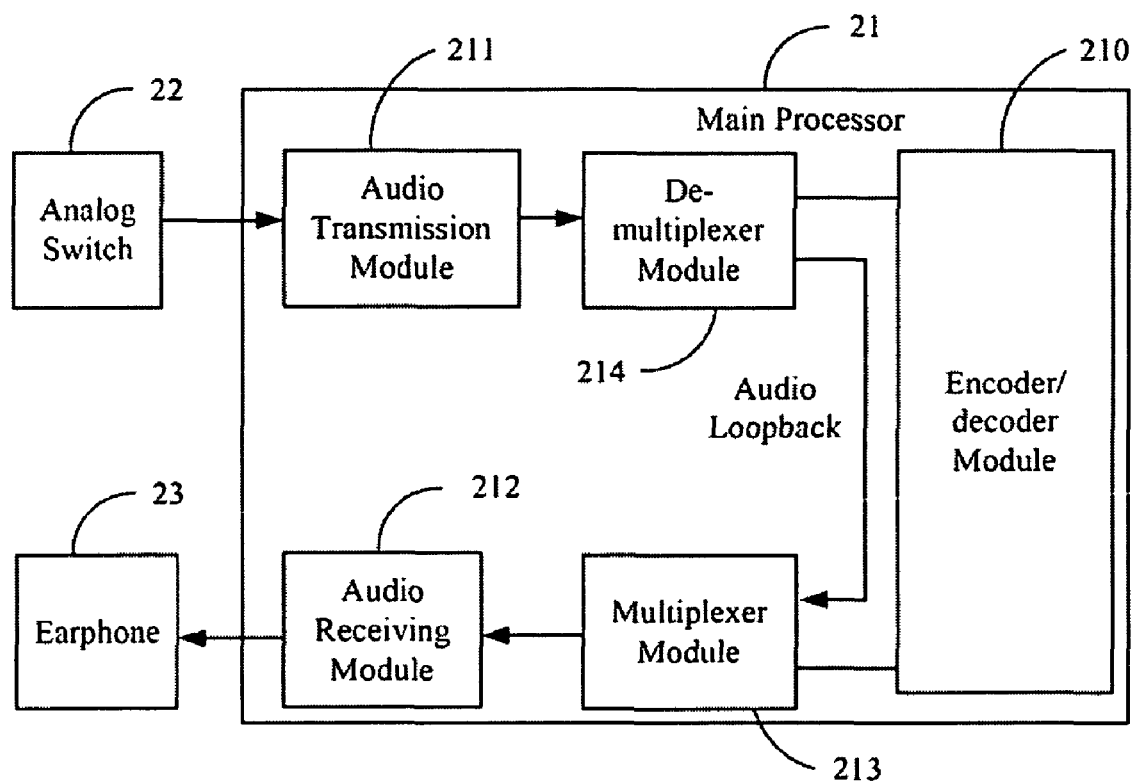
FIG. 3 is a schematic diagram of one embodiment of a main processor employed in the wireless communication device of FIG. 2.

FIG. 3 is a schematic diagram of one embodiment of the main processor 21 of FIG. 2, which further includes an encoder/decoder module 210, an audio transmission module 211, an audio receiving module 212, a multiplexer module 213, and a de-multiplexer module 214, with the software amplifier 28 integrated in the audio transmission module 211 and the audio receiving module 212. In one embodiment, the software amplifier 28 can also be integrated in other modules of the main processor 21. The audio transmission module 211 is operable to receive, process and amplify the demodulated signals or the communication voice signals from the analog switch 22 according to the working mode of the wireless communication device 2. The de-multiplexer module 214 is connected to the audio transmission module 211 and is operable to output the amplified demodulated signals or the amplified communication voice signals from the audio transmission module 211 to the encoder/decoder module 210 or the multiplexer module 213 according to the working mode of the wireless communication device 2. The de-multiplexer module 214 outputs the amplified communication voice signals from the audio transmission module 211 to the encoder/decoder module 210 when in the communication mode, and the amplified demodulated signals to the multiplexer module 213 when in the radio mode.

The encoder/decoder module 210 is operable to receive the amplified communication voice signals from the de-multiplexer module 214, and encode and transmit the amplified communication voice signals, receive external audio signals by a built-in antenna of the wireless communication device 2 (not shown and different from the earphone 23), and decode the external audio signals. In one embodiment, the external audio signals are incoming communication voice signals from another communication device. The multiplexer module 213 is operable to receive the amplified demodulated signals from the de-multiplexer module 214 or the decoded external audio signals from the encoder/decoder module 210 and output the received signals to the audio receiving module 212. The audio receiving module 212 is operable to process and amplify the amplified demodulated signals or the decoded external audio signals from the multiplexer module 213 and output the amplified signals to the earphone 23.

In one embodiment, the main processor 21 includes a testing loop for determining if the wireless communication device 2 are functioning normally during testing of the wireless communication device 2, which is not used during normal use of the wireless communication device 2. The testing loop includes the audio transmission module 211, the de-multiplexer module 214, the multiplexer module 213, and the audio receiving module 212. In the testing loop, communication voice signals from users are transmitted to the earphone 23 through the audio transmission module 211, the de-multiplexer module 214, the multiplexer module 213, and the audio receiving module 212, without being transmitted to the encoder/decoder module 210, creating audio loopback. In one embodiment, the audio loopback is used when the wireless communication device 2 is in the radio mode.

In one embodiment, the audio transmission module 211 and the audio receiving module 212 are integrated with the software amplifier 28 to amplify the demodulated signals to control volume by the audio loopback of the wireless communication device 2. Because the main processor 21 has been preset with different audio processing functions by suppliers, which are provided to users by parameter tables or software application programming interface, the audio transmission module 211 and the audio receiving module 212 integrated with the software amplifier 28 can be achieved by editing the parameter tables or the software application programming interface.

The wireless communication device 2 assumes only one working mode, either the communication mode or the radio mode, at a time. That is, the wireless communication device 2 provides only one kind of audio signal, either the demodulated signals or the communication voice signals, at a time. Thus, the de-multiplexer module and the multiplexer module 213 also output only the demodulated signals or the communication voice signals at a time.

For example, when the wireless communication device 2 is in the radio mode, the FM IC 20 is turned on via the control interface. The earphone 23 receives RF signals from the air, and the FM IC 20 demodulates the RF signals, and outputs demodulated signals to the analog switch 22. At this time, the analog switch 22 receives only the demodulated signals, and outputs the demodulated signals to the main processor 21. The main processor 21 functions in the audio loopback. That is, the audio transmission module 211 processes and amplifies the demodulated signals, and outputs the amplified demodulated signals to the de-multiplexer module 214. Then, the amplified demodulated signals are transmitted to the audio receiving module 212 for further processing and amplification via the de-multiplexer module 214 and the multiplexer module 213. Finally, the audio receiving module 212 transmits the demodulated signals amplified twice to the earphone 23. Thus, radio play is enabled.

When the wireless communication device 2 is in the communication mode, the FM IC 20 is turned off, and the audio loopback is not used. When wireless communication device 2 receives voice input, the microphone 24 transmits the communication voice signals to the analog switch 22. The analog switch 22 transmits the communication voice signals to the audio transmission module 211 for processing and amplification, and then to the de-multiplexer module 214. The de-multiplexer module 214 transmits the processed communication voice signals to the encoder/decoder module 210 for encoding, and the encoder/decoder module 210 sends out the encoded communication voice signals via the built-in antenna of the wireless communication device 2 for transmission to other devices. The encoder/decoder module 210 also receives external audio signals, that is, incoming communication voice signals, by the built-in antenna of the wireless communication device 2, decodes the external audio signals, and transmits the decoded external audio signals to the multiplexer module 213 for transmission to the audio receiving module 212. The audio receiving module 212 processes and amplifies the decoded external audio signals, and transmits the processed external audio signals to the earphone 23 to play. Thus, communication with other devices is enabled.

Figure 4:
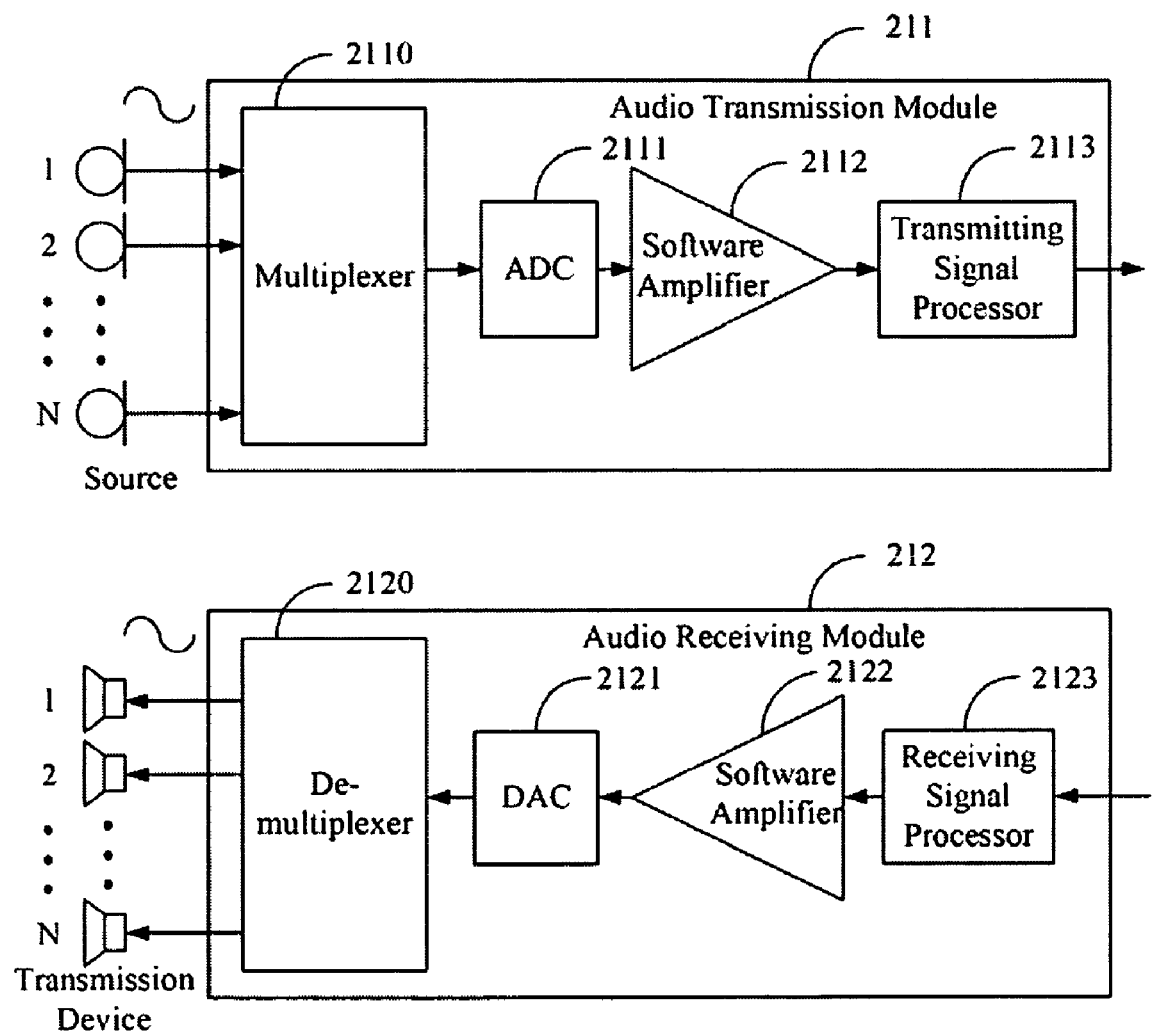
FIG. 4 is a schematic diagram of one embodiment of an audio transmission module and an audio receiving module employed in a main processor of the wireless communication device of FIG. 2.

FIG. 4 is a schematic diagram of one embodiment of the audio transmission module 211 and the audio receiving module 212. The audio transmission module 211 includes a multiplexer 2110, an analog-to-digital converter (ADC) 2111, a software amplifier 2112, and a transmitting signal processor 2113. Here, the above elements of the audio transmission module 211 are controlled by software. The multiplexer 2110 is operable to receive and output a plurality of analog audio signals from a plurality of sources, for example, receive and output the demodulated signals or the communication voice signals from the analog switch 22. The ADC 2111 is operable to convert the demodulated signals or the communication voice signals to a digital audio signal. The software amplifier 2112 is operable to amplify the digital audio signal by software. The transmitting signal processor 2113 is operable to filter noise from the amplified digital audio signals.

The audio receiving module 212 includes a de-multiplexer 2120, a digital-to-analog converter (DAC) 2121, a software amplifier 2122, and a receiving signal processor 2123, controlled by software. The receiving signal processor 2123 is operable to receive the decoded external audio signals or the amplified demodulated signals and filter noise therefrom. The software amplifier 2122 is operable to amplify the filtered signals by software. The DAC 2121 is operable to convert the amplified and filtered signals to analog audio signals. The de-multiplexer 2120 is operable to output the analog audio signals to one of a plurality of transmission devices, such as the earphone 23.

The wireless communication device 2 amplifies audio signals by the software amplifier 28 of the main processor 21, and uses the audio loopback to provide radio play. Thus, there is no need for external audio amplifiers, which reduces size of the wireless communication device 2 and decreases costs thereof.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A wireless communication device, comprising:
an earphone acting as an internal antenna to receive radio frequency signals; and
a frequency modulation integrated circuit (FM IC) operable to receive and demodulate the radio frequency signals and output the demodulated signals;
a microphone operable to receive input communication voice signals;
an analog switch connected to the FM IC and the microphone, operable to output the demodulated signals or the communication voice signals; and a main processor connected to the analog switch, and comprising a software amplifier operable to amplify the demodulated signals or the communication voice signals and output the amplified demodulated signals or communication voice signals to the earphone;

wherein a working mode of the wireless communication device comprises a communication mode and a radio mode, and the analog switch receives the demodulated signals from the FM IC and outputs the demodulated signals to the main processor when the wireless communication device is in the radio mode.

2. The wireless communication device of claim 1, wherein the main processor further comprises:

an audio transmission module operable to receive and process the demodulated signals or the communication voice signals from the analog switch;

a de-multiplexer module operable to output the processed demodulated signals or communication voice signals according to the working mode of the wireless communication device;

an encoder/decoder module operable to receive the processed communication voice signals from the de-multiplexer module, and encode the processed communication voice signals, and to receive external audio signals by a built-in antenna of the wireless communication device, and decode the external audio signals;

a multiplexer module operable to receive the processed demodulated signals from the de-multiplexer module or the decoded external audio signals from the encoder/decoder module and output the received signals; and an audio receiving module operable to amplify and output the processed demodulated radio frequency signals or the decoded external audio signals to the earphone.

3. The wireless communication device of claim 2, wherein the software amplifier is integrated into the audio transmission module and the audio receiving module.

4. The wireless communication device of claim 3, wherein the de-multiplexer module outputs the processed demodulated signals from the audio transmission module to the multiplexer module when the wireless communication device is in the radio mode.

5. The wireless communication device of claim 3, wherein the de-multiplexer module outputs the processed communication voice signals from the audio transmission module to the encoder/decoder module when the wireless communication device is in the communication mode.

6. The wireless communication device of claim 2, wherein the audio transmission module comprises:

a multiplexer operable to receive and output the demodulated signals or the communication voice signals from the analog switch;

an analog-to-digital converter operable to convert the demodulated signals or the communication voice signals from the multiplexer to a digital audio signal;

a software amplifier operable to amplify the digital audio signal by software; and a transmitting signal processor operable to filter noise from the amplified digital audio signals.

7. The wireless communication device of claim 2, wherein the audio receiving module comprises:

a receiving signal processor operable to receive the processed demodulated signals or the decoded external audio signals and filter noise therefrom;

a software amplifier operable to amplify the filtered processed demodulated signals or the filtered decoded external audio by software;

a digital-to-analog converter operable to convert the amplified filtered processed demodulated signals or the amplified filtered decoded external audio to analog audio signals; and a de-multiplexer operable to output the analog audio signals to the earphone.

8. The wireless communication device of claim 1, wherein the earphone is further operable to receive and play the amplified demodulated signals or communication voice signals from the main processor.

9. The wireless communication device of claim 1, wherein the analog switch receives the communication voice signals from the microphone and outputs the communication voice signals to the main processor when the wireless communication device is in the communication mode.

10. A wireless communication device, comprising a main processor operable to process various audio signals, wherein the main processor comprises:

an audio transmission module integrated with a software amplifier, operable to receive, process, and amplify audio signals;

a de-multiplexer module operable to output the processed and amplified audio signals from the audio transmission module according to a working mode of the wireless communication device, wherein the working mode of the wireless communication device comprises a communication mode and a radio state;

an encoder/decoder module operable to encode the processed and amplified audio signals from the de-multiplexer module when the wireless communication device is in the communication mode, receive external audio signals by a built-in antenna of the wireless communication device, and decode the external audio signals;

a multiplexer module operable to receive the processed and amplified audio signals from the de-multiplexer module when the wireless communication device is in the radio mode, receive the decoded external audio signals from the encoder/decoder module when the wireless communication device is in the communication mode, and output the received audio signals; and an audio receiving module integrated with a software amplifier, operable to process, amplify, and output the audio signals output from the multiplexer module.

11. The wireless communication device of claim 10, wherein the audio transmission module comprises:

a multiplexer operable to receive and output the audio signals;

an analog-to-digital converter operable to convert the audio signal from the multiplexer to a digital audio signal;

a software amplifier operable to amplify the digital audio signal by software; and a transmitting signal processor operable to filter noise from the amplified digital audio signals.

12. The wireless communication device of claim 10, wherein the audio receiving module comprises:

a receiving signal processor operable to receive the received audio signals from the multiplexer module and filter noise from the received audio signals from the multiplexer module;

a software amplifier operable to amplify the filtered audio signals by software;

a digital-to-analog converter operable to convert the amplified filtered audio signals to analog audio signals; and a de-multiplexer operable to output the analog audio signals.

* * * * *